United States Patent [19]

Weissfloch

[11] Patent Number: 5,112,210
[45] Date of Patent: May 12, 1992

[54] BENDING MACHINE

[75] Inventor: Rinhard Weissfloch, Aachen, Fed. Rep. of Germany

[73] Assignee: Wegener GmbH, Fed. Rep. of Germany

[21] Appl. No.: 604,908

[22] Filed: Oct. 31, 1990

[30] Foreign Application Priority Data

Nov. 1, 1989 [EP] European Pat. Off. ......... 89120237.6

[51] Int. Cl.⁵ .............................................. B29C 53/04
[52] U.S. Cl. ..................................... 425/383; 72/319; 264/339
[58] Field of Search ............. 425/383, 384, 402, 403.1, 425/319, 394, 397, 135, 145; 264/339; 72/319

[56] References Cited

U.S. PATENT DOCUMENTS

| 2,937,689 | 5/1960 | Peterson | 425/394 |
| 3,149,376 | 9/1964 | Lee | 425/155 |
| 3,888,613 | 6/1975 | Fries et al. | 425/384 |
| 3,946,588 | 3/1976 | Mayston | 72/319 |
| 4,557,684 | 12/1985 | Romine et al. | 425/38.3 |
| 4,781,787 | 11/1988 | Weissfloch et al. | 156/304.6 |
| 4,944,176 | 7/1990 | Glorieux et al. | 72/319 |

FOREIGN PATENT DOCUMENTS

| 3637436 | 5/1988 | Fed. Rep. of Germany . |
| WO8702618 | 5/1987 | PCT Int'l Appl. ................. 425/383 |
| 1017407 | 5/1983 | U.S.S.R. ............................... 72/319 |

Primary Examiner—Jay H. Woo
Assistant Examiner—Robert B. Davis
Attorney, Agent, or Firm—Joseph W. Berenato, III

[57] ABSTRACT

A bending machine for thermoplastic workpieces includes a first clamp assembly having first and second clamping jaws. A second clamp assembly is disposed along a first side of the first clamp assembly and includes third and fourth clamping jaws. The second clamp assembly is displaceable relative to the first clamp assembly, and the fourth clamping jaw is in planar alignment with the second clamping jaw. A heater assembly includes at least a first heating knife disposed along the first side of the first clamp assembly, and is displaceable relative to the first clamp assembly. A bending jaw is disposed along an opposite second side of the first clamp assembly and is pivotal between a first position in planar alignment with the second and fourth clamping jaws and a second position angularly disposed relative thereto.

20 Claims, 3 Drawing Sheets

BENDING MACHINE

The invention concerns a bending machine for processing thermoplastic workpieces and comprises (a) a bending jaw to bend the workpiece, (b) a stop for the front end of the workpiece when inserted into the bending machine, (c) a heater movable within the machine frame toward and away from the workpiece to plasticize bending lines at the workpiece, (d) a clamp stationary at least during operation and adjacent to the bending jaw to tighten in place the workpiece near the bending line during a bending procedure, (e) a holder to hold the workpiece during the heating phase caused by the heater and movable to-and-fro relative to the clamp.

The applicant manufactures such a machine. This machine comprises a stationary clamp at the middle of the machine frame and followed, as seen in the direction of advance of the workpiece, by a strip-like bending jaw suspended in pivoting manner. A heater and a holder are mounted after the clamp and on a frame moving to-and-for relative to the direction of advance. The heater consists of two superposed, vertically displaceable heating knives behind which there is the holder in the form of a tightening strip. A stop strip is present on the other side of the bending jaw and is movably supported on two side rails.

When proceeding to bending, first the stop strip and the frame with the heater and holder are adjusted to be symmetrical with the front edge of the bending jaw, and then are fastened in place. Next a workpiece, initially in the form of a flat blank, is inserted from the rear in such manner that it comes to rest between the clamping strip of the holder and the two heating knives. The front edge of the workpiece rests against stops in the zone of the bending jaw. Then the heating knives are moved closer so that they rest against the two sides of the workpiece which they heat in such manner, thereby forming a bending line, so that the workpiece is deformable at that bending line. During this procedure the workpiece is held in place both by the clamp and by the holder.

Once the bending line has been sufficiently heated, the clamp and the holder are deactivated, that is, the workpiece is released. Next, it is manually moved forward toward the stop strip until resting against it. Thereupon the clamp is reactivated, that is, the workpiece is supported over its broad surface and tightened in place. Next the bending jaw is pivoted upward in relation to the desired angle of bending, whereby that part of the workpiece which is in front of the clamp is bent upward at the bending line. Simultaneously the next bending line is formed by the heating knives being made to rest again against that part of the workpiece which is located there. After bending has been completed, the clamp and holder are released again and once more the workpiece is advanced to the stop strip, so that the heated bending line comes to rest against the front edge of the bending jaw. A further bending procedure follows. Depending on the angle of bending, a cross-sectionally polygonal, especially square pipe or tube segment can be formed.

The drawbacks of this bending machine are the time-consuming adjustment because the stop strip and the frame must be aligned accurately and symmetrically with the heater and holder each time before bending begins. Again alignment is required if the lengths of the sides must be different. Handling during operation is cumbersome, considering that some of the workpieces are very heavy and must be moved by hand. There is more than trivial danger of accidents.

This bending machine has been developed further for the sake of automatically controlling the entire bending process and hence to lower the danger of accidents. As shown by the German patent 36 37 436, the stationary design of the clamp was abandoned and instead it was made movable in and opposite to the direction of advance of the workpiece. Here the clamp no longer serves only to tighten the workpiece in place when bending with the bending jaw. The clamp now also assumes the function of the holder in the known bending machine, that is, the fastening of the workpiece while the heater is forming the bending line. For that purpose the clamp when open is movable from a position near the bending jaw into a position away from the bending jaw with reference to the bending line, and then is transferred into the tightening position. After the bending line has been formed, the clamp again is moved toward the bending jaw and thereby moves the workpiece with the heated bending line as far as the bending jaw. In this bending machine the holder only tightens the workpiece in place when the clamp is in its deactivated state, that is, in its open state, and is moved back from the bending jaw.

Because of this bending-machine design, handling is required only to insert the workpiece. All the remainder is taken over by the bending machine itself. Manual intervention into the machine, with the attendant danger of accident, no longer is required. It is possible to bend in wholly automatic manner, so that, following workpiece insertion and setting of the spacing between two bending lines, further action is not required.

In a special design, the heater of the bending machine of the German patent 36 37 436 is mounted on the clamp so that it is always moved together with it. The holder may be movable in and opposite the direction of advance of the workpiece and it may comprise a lock to tighten it in position relative to the machine frame.

The above described machine is very complex and hence expensive. Moreover it incurs the significant drawback of long cycles, that is, much time elapses between two bending procedures. This is due to the clamp being forced to remain in the position near the bending jaw during bending and further also some time after bending until the bending line has hardened. Depending on the kind and the thickness of the workpiece material, the time loss so entailed is at least 30 to 40 seconds, frequently however several minutes. Only thereafter will it be possible to move back the clamp and form a new bending line using the heater. The advantage of automation and hence of a single operator therefore is traded off against substantially longer cycles compared to the predecessor machine, especially where thick-wall workpieces are concerned.

Accordingly it is the object of the invention to so design a bending machine that on one hand—in the manner of the German patent 36 37 435—manual advance of the workpiece shall not be required between two bending procedures and on the other hand however short cycles shall be achieved with low design complexity.

SUMMARY OF THE INVENTION

This problem is solved by the invention by a bending machine with the following features:

(f) The holder is freely movable during bending-machine operation.

(g) A motor-driven displacement means is provided for moving the holder, (h) The bending machine comprises a control such that (aa) the holder in its closed position together with the tightened workpiece can be moved for open clamp toward the bending jaw, (bb) following the tightening of the workpiece in the clamp, the holder in its open state can be moved back from said clamp, and (cc) following the tightening of the workpiece in the clamp, the heater can be activated to form a bending line.

Accordingly the bending machine of the invention departs from the principle of the German patent 36 37 436 wherein the workpiece is moved by means of a displaceable clamp. The invention uses the holder for that purpose and provides a corresponding drive and suitable control.

In the first place, the advantage of design simplicity is achieved. The basis may be the initially described original version of the bending machine with stationary clamp. The design changes relative to this version, when compared with those relative to the German patent 36 37 436, are less pronounced, merely free displacement of the holder being required and the clamp requiring being combined with a displacement drive and a control. The additional control assures that the bending machine shall be so operated that, compared with the case of the bending machine of the German patent 36 37 436, substantially shorter cycles are achieved This is due to the holder on one hand causing the displacement of the workpiece when the clamp is open, while on the other hand allowing being moved back following tightening the workpiece in the clamp in order to form a new bending line by means of the heater. Accordingly the time required to bend the workpiece and to harden the bending line is used to heat and hence to make, a new bending line. Both procedures essentially require the same time. Following opening of the clamp, that is following the bending and hardening procedure, the workpiece can be moved again by means of the holder toward the bending jaw. Therefore at least 30 to 40 seconds, often several minutes, can be saved per bending procedure.

Accordingly a bending machine is provided which offers semi or fully automatic control by one operator, while at the same time featuring exceedingly short cycles and high processing rates. The inventiveness is emphasized by the fact that these advantages are achieved by the comparatively simple design of the bending machine.

In the embodiment of the invention, the heater is mounted on the holder, that is, the heater always shall be displaced together with the holder. In this way no separate control is needed to match the motion of the heater to that of the holder. Appropriately, the heater also can be activated during the motion of the workpiece. In this way the time interval for displacing therefor the workpiece as far as the bending jaw can be used to heat the bending line. Actuation must be construed as the effect of the heater on the workpiece to achieve heating along a line.

In manner known per se the holder may consist of at least two mutually displaceable clamping strips.

The invention is shown in further detail in an embodiment in the drawings.

DESCRIPTION OF THE PREFERRED EMBODIMENT

Figure 1:
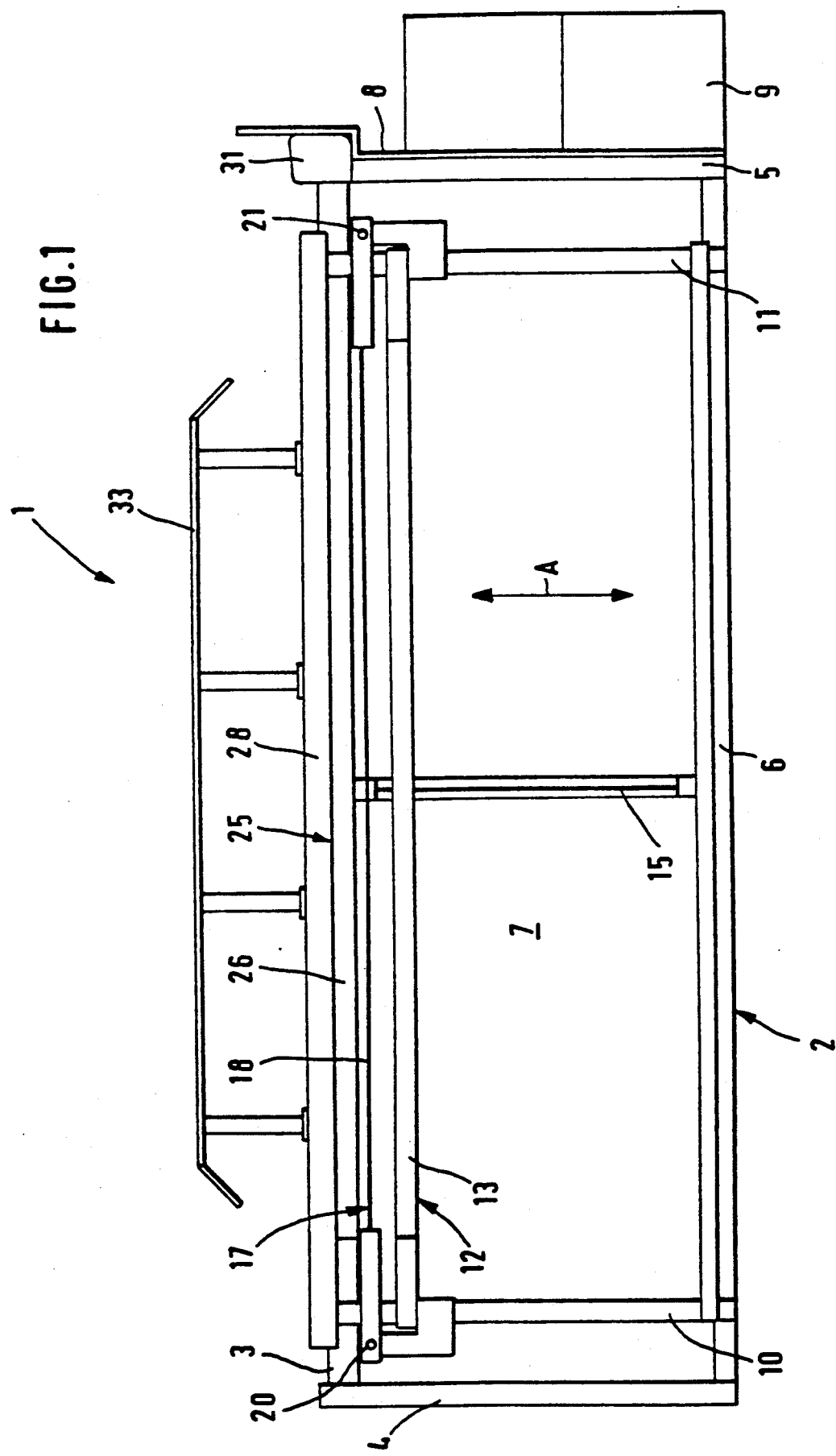
FIG. 1 is a topview of the bending machine.

The bending machine 1 shown in the Figures comprises a machine frame 2, essentially consisting of a front frame segment 3, two side frame segments 4, 5 and a rear frame segment 6. The frame segments 3,4,5,6 enclose a rectangle 7 essentially clear on the inside.

Figure 2:
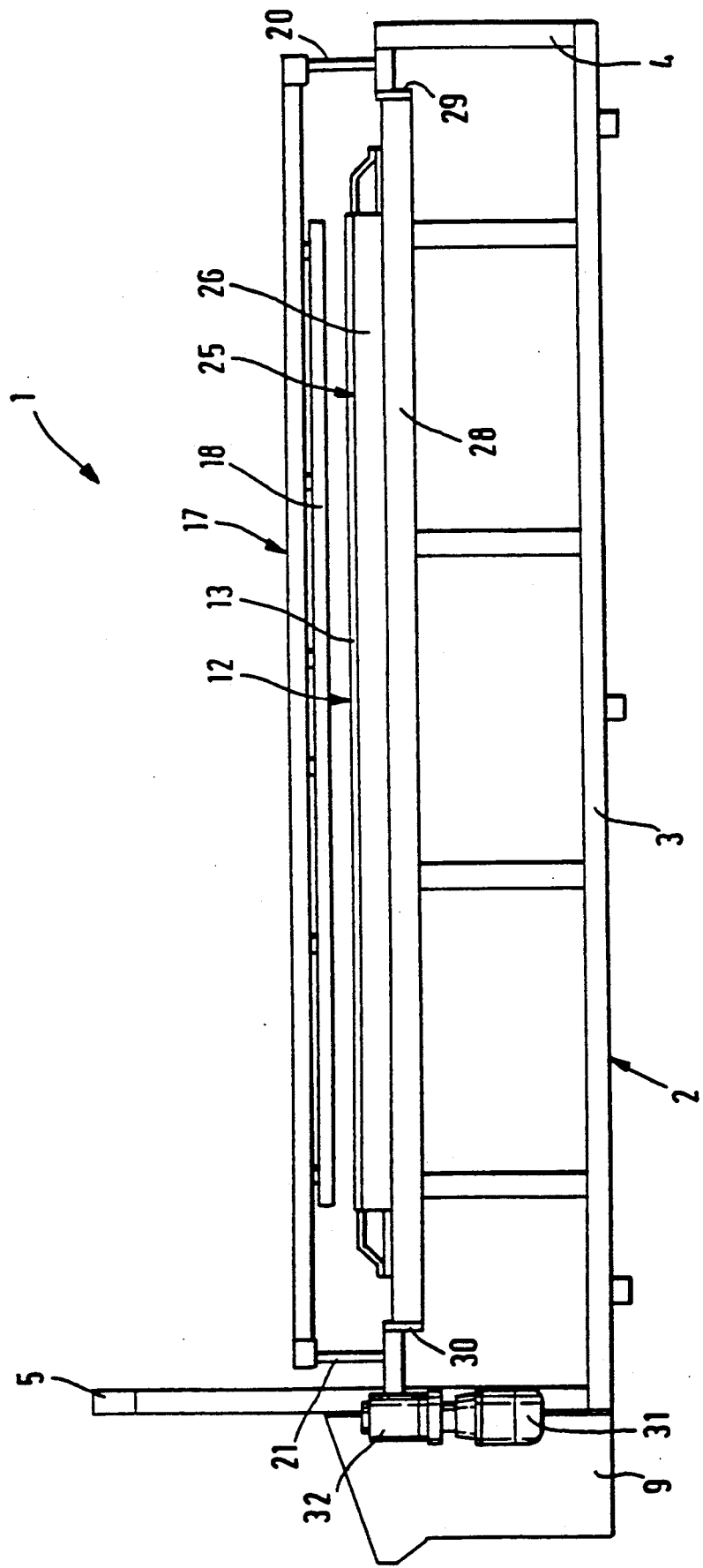
FIG. 2 is a front view of the bending machine of FIG. 1 as seen from the bending jaw.
Figure 3:
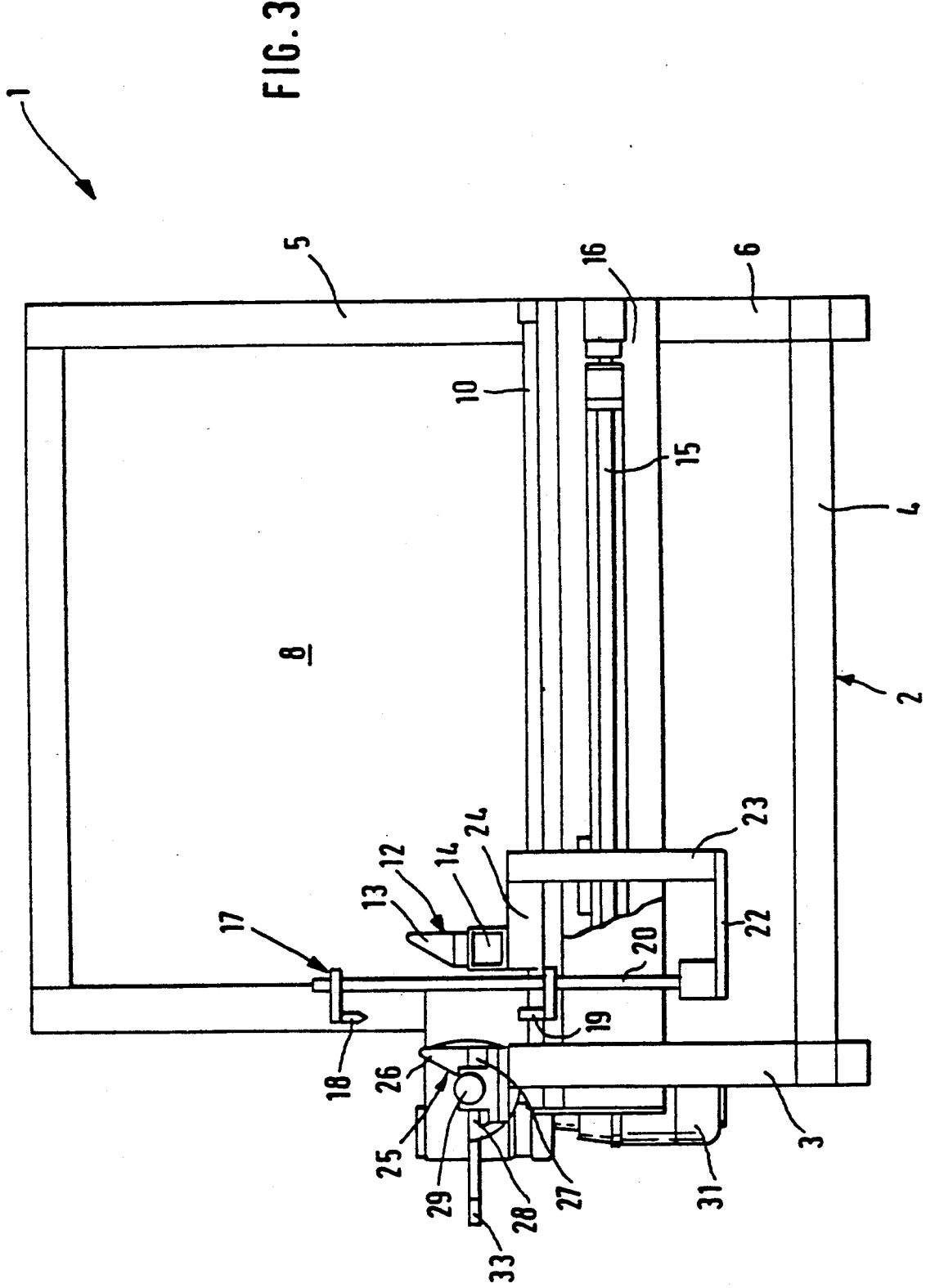
FIG. 3 is a sideview of the bending machine of FIGS. 1 and 2 with partial sections.

As shown in particular by FIGS. 2 and 3, the side frame segment 5 rises higher and serves as a frame for an acrylic glass pane 8. An operating desk 9 is set sideways against this lateral frame segment 5.

Guide bars 10, 11 extend each near and parallel to the side frame segments 5, 6 and between the front frame segment 3 and the rear frame segment 6. A holder 12 is supported in displaceable manner in the direction of the double arrow A on these guide bars 10, 11. The holder 12 consists of two superposed clamping strips 13, 14 of which the upper strip 13 can be raised relative to the lower strip 14 or be lowered toward said lower strip in order to tighten a plastic pane by means of a pneumatic actuator not shown herein in further detail. The lower clamping strip 14 is connected to a positioning cylinder 15 lacking a piston rod and mounted parallel and centrally to the guide bars 10, 11 and on a brace 16 extending between the front frame segment 3 and the rear frame segment 6. The positioning cylinder 15 is operated with compressed air. When the lower clamping strip 14 is displaced, the upper clamping strip 13 also is carried along, that is, it retains its relative position to the lower clamping strip 14 to this extent.

A heater 17 is connected to the lower clamping strip 14 of the holder 12. This heater comprises two heating knives 18, 19 which are parallel to the clamping strips 13, 14 and which are superposed but apart; these knives are guided in vertically displaceable manner along side guide bars 20, 21. Pneumatic cylinders not shown in further detail are provided for that purpose. In this manner the heating knives 18, 19 can be moved from above and below toward a plastic plate tightened between the clamping strips 13, 14 in the holder 12. The heating knives 18, 19 are heated with electrical energy.

As shown in particular by FIG. 3., the guide bars 20, 21 are mounted at the lower side to a horizontal crossbeam 22 which is connected by a vertical beam 23 and a horizontal beam 24 to the lower side of the lower clamping strip 14. Accordingly the heater 17 is carried along when the holder 12 is displaced, that is, the position of the heating knives 18, 19 remains the same relative to the clamping strips 13, 14 except for their heights.

A clamp 25 is mounted to the front frame segment 3. The clamp 25 essentially is designed the same way as the holder 12, that is, it also comprises an upper clamping strip 26 and a lower clamping strip 27. The lower clamping strip 27 is stationary. Its top side is the same height as the top side of the lower clamping strip 14 of the holder 12. The upper clamping strip 26 of the clamp 25 is driven into vertical motion by means of pneumatic cylinders not shown in further detail. When the position is open, a plastic plate can be inserted between the clamping strips 26, 27 and be tightened in place by the lowering of the upper clamping strip 26.

A bending jaw 28 is present in front of the clamp 25, namely in front of the lower clamping strip 27. This jaw extends essentially across the width of the machine frame 2 and is pivotable about a horizontal axis, by means of pivot bearings 29, 30, from the horizontal position shown in FIG. 3 to a vertical position. An electric motor 31 is used for that purpose, of which the torque is transmitted by a bevel gear system 32 to the bending jaw 28. In the horizontal position, the top side of the bending jaw 28 is flush with the top sides of the lower clamping strips 14 and 27 of the holder 12 and clamp 25 resp. In addition, a support frame 33 is mounted to the bending jaw 28 to additionally support the plastic part to be bent.

Bending takes place as follows with the bending machine 1 shown above:

First the holder 12 is moved from the operating desk 9 into the shown front end position in order to define a control null position. The clamping strips 13, 14 of the holder 12 and the clamping strips 26, 27 of the clamp 25 are raised into the open position. Also the bending jaw 28 is pivoted upward by 90 relative to the position shown in FIG. 3 in order to form a stop. Now a plastic plate can be inserted from the rear, first between the clamping strips 13, 14 of the holder 12, and then forward between the clamping strips 26, 27 of the clamp 25, until it comes to rest by its front edge against the bending jaw 28.

Next the desired distance of the bending line from the free end of the plastic plate abutting the bending jaw 28 is fed into the control. The ensuing procedure is carried out either manually, that is, semi-automatically, or, if the control has been appropriately programmed, fully automatically.

First the clamp 25 is closed by lowering the upper clamping strip 26 and thereby the plastic plate has been tightened in its place. Thereupon the holder 12 in its open state is displaced to the rear, that is away from the clamp 25, by a suitable control of the positioning cylinder 15, and this by such a magnitude that the heating knives 18, 19 following the stopping of the holder 12 come to a stop above the desired bending line. The plastic plate then is tightened in place in the holder 12 by lowering the upper clamping strip 13. At the same time the two heating knives 18, 19 are moved toward each other until they come to rest against the upper and lower sides resp. of the plastic plate. Then they heat so much of the plastic in the range of the desired bending line that it plasticises and becomes flexible.

Once the bending line has been sufficiently heated, the clamp 25 is opened by lifting the upper clamping strip 26. Thereupon the holder 12 is displaced again toward the bending jaw 28 by suitably controlling the positioning cylinder 15. At the same time the heating knives 18, 19 are detached from the plastic plate upward and downward so much that, upon further advance of the holder 12, they no longer may collide with the clamp 25 or the bending jaw 28. The horizontal spacing between the heating knives 18, 19 and the clamping strips 13, 14 of the holder 12 is designed to be such that the heated bending line shall come to rest somewhat above the rear edge of the bending jaw 28 when reaching the front end position of the holder 12.

Thereupon the clamp 25 is closed by lowering the upper clamping strip 26 and thereby the plastic panel has been tightened in place. Next the electric motor 31 is driven in such a way that the bending jaw, together with the support structure 33, is pivoted upward. As a result that part of the plastic plate that was slipped onto the bending jaw 28 is correspondingly bent upward, an arbitrary angle being settable by suitable input into the control.

Immediately after the plastic plate has been tightened in place in the clamp 25, that is, still during the bending procedure, the tightening of the plastic plate in the holder 12 is released by moving the upper clamping strip 13 upward, and the holder 12 is displaced to the rear by means of the positioning cylinder 15 until the heating knives 18, 19 again are flush with the nearest provided bending line. The distance to the first bending line can be set by a corresponding input to the control, that is, this distance may be the same as in the first bending procedure, or a different distance may be fed in. Upon stopping the holder 12, the plastic plate is tightened in place by lowering the upper clamping strip 13 and the heating knives 18, 19 are moved downward and upward resp. to rest against the surfaces of the plastic plate.

A further bending line is formed therefore during the bending and hardening process at the previous bending line. Once this process is complete and the new bending line has been sufficiently heated, the previously described procedure is repeated, that is, the holder 12 is closed while the plastic plate is tightened in place and following opening of the clamp 25 it is displaced toward the bending jaw 28 where the heating knives 18, 19 are moved away from the plastic plate. When the front end position of the holder 12 is reached, another bending procedure ensues in the previously described manner.

If desired, a hollow body may be formed in this way, of which the sole open site is a slit which later can be closed by a suitable welding system.

I claim:

1. A bending machine for thermoplastic workpieces, comprising:
   a. a first clamp assembly comprising first and second clamping jaws;
   b. a second clamp assembly disposed along a first side of said first clamp assembly and comprising third and fourth clamping jaws, said second clamp assembly displaceable relative to said first clamp assembly;
   c. a heater assembly comprising at least a first heating knife disposed along said first side and displaceable relative to said first clamp assembly; and,
   d. a bending jaw disposed along an opposite second side of said first clamp assembly and being pivotal between a first position in planar alignment with said second clamping jaw and a second position angularly disposed relative thereto.

2. The bending machine of claim 1, wherein:
   a) said heater assembly is operably connected to and movable with said second clamp assembly.

3. The bending machine of claim 2, wherein said heater assembly includes:
   a) a second heating knife, each of said heating knives is operably associated with one of said third and fourth clamping jaws.

4. The bending machine of claim 1, wherein:
   a) said fourth and second clamping jaws are maintained in fixed alignment, and said first and third clamping jaws are movable relative to the plane of alignment of said second and fourth clamping jaws.

5. The bending machine of claim 4, wherein:
   a) said heating knife is movable relative to the plane of alignment of said second and fourth clamping jaws.

6. The bending machine of claim 5, wherein said heater assembly includes:
   a) a second heating knife, each of said heating knives is operably associated with one of said third and fourth clamping jaws and each of said heating knives is movable relative to the plane of alignment of said second and fourth clamping jaws.

7. The bending machine of claim 6, wherein:
   a) each of said heating knives and said first and third clamping jaws is movable transverse to the plane of alignment of said second and fourth clamping jaws.

8. The bending machine of claim 1, wherein:
   a) control means are operably connected with said first and second clamp assemblies and said heater assembly for permitting said heater assembly to be operated when said second clamp assembly is holding a workpiece between said third and fourth clamping jaws.

9. The bending machine of claim 1, further comprising:
   a) first drive means operably associated with said bending jaw for causing pivoting thereof.

10. The bending machine of claim 9, wherein:
    a) said drive means includes an electric motor and a bevel gear system.

11. The bending machine of claim 9, further comprising:
    a) second drive means operably associated with said second clamp assembly for causing displacement thereof.

12. The bending machine of claim 11, wherein:
    a) said second drive means includes a positioning cylinder.

13. The bending machine of claim 12, wherein:
    a) said positioning cylinder is operably associated with said fourth clamping jaw.

14. The bending machine of claim 1, wherein:
    a. said fourth clamping jaw is in planar alignment with said second clamping jaw.

15. A bending machine for thermoplastic workpieces, comprising:
    a) a frame having front and rear edges and oppositely disposed side edges extending therebetween;
    b) a bending jaw operably associated with sand disposed forwardly of said front edge, said bending jaw being pivotal between a first horizontal position and a second position angularly and upwardly disposed relative thereto;
    c) a first clamp assembly operably associated with and disposed rearwardly of said bending jaw, said first clamp assembly including first and second clamping jaws and said second clamping jaw is in planar alignment with said bending jaw when in said first position;
    d) a heater assembly operably associated with and disposed rearwardly of said first clamp assembly and displaceable relative thereto, said heater assembly including at least a first heating knife;
    e) a second clamp assembly operably associated with and disposed of rearwardly of said heater assembly and displaceable relative to said first clamp assembly, said second clamp assembly includes third and fourth clamping jaws and said fourth clamping jaw is in planar alignment with said second clamping jaw;
    f) first drive means operably associated with said bending jaw for causing pivoting thereof; and,
    g) second drive means operably associated with said heater assembly and said second clamp assembly for causing associated displacement thereof.

16. The bending machine of claim 15, further comprising:
    a) a support frame, said heater assembly and said second clamp assembly being mounted to said support frame.

17. The bending machine of claim 15, wherein:
    a) said second and fourth clamping jaws are disposed in fixed vertical orientation, and said first and third clamping jaws are vertically moveable relative thereto.

18. The bending machine of claim 15, wherein:
    a) said first drive means includes an electric motor and a bevel gear assembly, and said second drive means including a positioning cylinder.

19. The bending machine of claim 18, wherein:
    a) said positioning cylinder is disposed below and extends parallel to the plane of alignment of said second and fourth clamping jaws.

20. The bending machine of claim 15, wherein said heater assembly includes:
    a) a second heating knife, each of said heating knives is operably associated with one of said third and fourth clamping jaws and is vertically moveable relative to the plane of alignment of said second and fourth clamping jaws.

* * * * *